(12) United States Patent
Katariya et al.

(10) Patent No.: US 7,822,699 B2
(45) Date of Patent: Oct. 26, 2010

(54) ADAPTIVE SEMANTIC REASONING ENGINE

(75) Inventors: Sanjeev Katariya, Bellevue, WA (US);
Qi Steven Yao, Sammamish, WA (US);
Jun Liu, Bellevue, WA (US); William D. Ramsey, Redmond, WA (US);
Jianfeng Gao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 11/290,076

(22) Filed: Nov. 30, 2005

(65) Prior Publication Data
US 2007/0124263 A1    May 31, 2007

(51) Int. Cl.
*G06N 5/00* (2006.01)
*G06F 17/00* (2006.01)

(52) U.S. Cl. .......... 706/45; 715/716; 704/251; 704/4

(58) Field of Classification Search ............ 706/45; 704/4, 9; 707/3, 5
See application file for complete search history.

(56) References Cited

U.S. PATENT DOCUMENTS

| | | | |
|---|---|---|---|
| 4,736,296 A | 4/1988 | Katayama et al. | |
| 4,965,763 A | 10/1990 | Zamora | |
| 4,974,191 A | 11/1990 | Amirghodsi et al. | |
| 5,208,816 A | 5/1993 | Seshardi et al. | |
| 5,477,451 A | 12/1995 | Brown et al. | |
| 5,577,241 A | 11/1996 | Spencer | |
| 5,625,814 A | 4/1997 | Luciw | |
| 5,636,036 A | 6/1997 | Ashbey | |
| 5,696,962 A * | 12/1997 | Kupiec | 707/4 |
| 5,748,974 A | 5/1998 | Johnson | |
| 5,752,244 A | 5/1998 | Rose et al. | |
| 5,754,173 A | 5/1998 | Hiura et al. | |
| 5,754,174 A | 5/1998 | Carpenter et al. | |

(Continued)

FOREIGN PATENT DOCUMENTS

EP    1 571 578 A1    9/2005

(Continued)

OTHER PUBLICATIONS

U.S. Appl. No. 11/270,393, filed Nov. 9, 2005, Ramsey, et al.

(Continued)

*Primary Examiner*—Donald Sparks
*Assistant Examiner*—Kalpana Bharadwaj
(74) *Attorney, Agent, or Firm*—Merchant & Gould P.C.

(57) ABSTRACT

Provided is an adaptive semantic reasoning engine that receives a natural language query, which may contain one or more contexts. The query can be broken down into tokens or a set of tokens. A task search can be performed on the token or token set(s) to classify a particular query and/or context and retrieve one or more tasks. The token or token set(s) can be mapped into slots to retrieve one or more task result. A slot filling goodness may be determined that can include scoring each task search result and/or ranking the results in a different order than the order in which the tasks were retrieved. The token or token set(s), retrieved tasks, slot filling goodness, natural language query, context, search result score and/or result ranking can be feedback to the reasoning engine for further processing and/or machine learning.

11 Claims, 12 Drawing Sheets

U.S. PATENT DOCUMENTS

| | | | |
|---|---|---|---|
| 5,794,259 | A | 8/1998 | Kikinis |
| 5,832,459 | A | 11/1998 | Cameron et al. |
| 5,855,015 | A | 12/1998 | Shoham |
| 5,892,900 | A | 4/1999 | Ginter et al. |
| 5,999,948 | A | 12/1999 | Nelson et al. |
| 6,088,700 | A | 7/2000 | Larsen et al. |
| 6,118,939 | A | 9/2000 | Nack et al. |
| 6,212,494 | B1 | 4/2001 | Boguraev |
| 6,278,996 | B1 | 8/2001 | Richardson et al. |
| 6,314,398 | B1 | 11/2001 | Junqua et al. |
| 6,513,006 | B2 | 1/2003 | Howard et al. |
| 6,643,620 | B1 | 11/2003 | Contolini et al. |
| 6,675,159 | B1 | 1/2004 | Lin et al. |
| 6,678,677 | B2 | 1/2004 | Roux et al. |
| 6,678,694 | B1 | 1/2004 | Zimmerman et al. |
| 6,690,390 | B1 | 2/2004 | Walters et al. |
| 6,724,403 | B1 | 4/2004 | Santoro et al. |
| 6,751,606 | B1 | 6/2004 | Fries et al. |
| 6,816,857 | B1 | 11/2004 | Weissman et al. |
| 6,850,252 | B1 | 2/2005 | Hoffberg |
| 6,901,399 | B1 | 5/2005 | Corston et al. |
| 6,904,402 | B1 | 6/2005 | Wang et al. |
| 6,910,003 | B1 | 6/2005 | Arnold et al. |
| 6,947,923 | B2 | 9/2005 | Cha et al. |
| 7,020,607 | B2 | 3/2006 | Adachi |
| 7,020,658 | B1 | 3/2006 | Hill |
| 7,328,199 | B2 | 2/2008 | Ramsey et al. |
| 7,523,099 | B1 | 4/2009 | Egnor et al. |
| 2002/0042793 | A1 | 4/2002 | Choi |
| 2002/0045463 | A1 | 4/2002 | Chen et al. |
| 2002/0049750 | A1 | 4/2002 | Venkatram |
| 2002/0065959 | A1 | 5/2002 | Kim et al. |
| 2002/0101448 | A1 | 8/2002 | Sanderson |
| 2002/0124115 | A1 | 9/2002 | McLean et al. |
| 2002/0143949 | A1 | 10/2002 | Rajarajan et al. |
| 2002/0152190 | A1 | 10/2002 | Biebesheimer et al. |
| 2003/0023598 | A1 | 1/2003 | Janakiraman et al. |
| 2003/0078766 | A1 | 4/2003 | Appelt et al. |
| 2003/0084035 | A1 | 5/2003 | Emerick |
| 2003/0120700 | A1 | 6/2003 | Boudnik et al. |
| 2003/0135584 | A1 | 7/2003 | Roberts et al. |
| 2003/0222912 | A1 | 12/2003 | Fairweather |
| 2004/0030556 | A1 | 2/2004 | Bennett |
| 2004/0030697 | A1 | 2/2004 | Cochran et al. |
| 2004/0030710 | A1 | 2/2004 | Shadle |
| 2004/0034652 | A1 | 2/2004 | Hofmann et al. |
| 2004/0111419 | A1 | 6/2004 | Cook et al. |
| 2004/0117395 | A1 | 6/2004 | Gong et al. |
| 2004/0122674 | A1 | 6/2004 | Bangalore et al. |
| 2004/0130572 | A1 | 7/2004 | Bala |
| 2004/0148154 | A1 | 7/2004 | Acero et al. |
| 2004/0181749 | A1 | 9/2004 | Chellapilla et al. |
| 2004/0236580 | A1 * | 11/2004 | Bennett .................. 704/270.1 |
| 2004/0250255 | A1 | 12/2004 | Kraiss et al. |
| 2004/0260534 | A1 | 12/2004 | Pak et al. |
| 2005/0027666 | A1 | 2/2005 | Beck et al. |
| 2005/0028133 | A1 | 2/2005 | Ananth et al. |
| 2005/0034098 | A1 | 2/2005 | DeSchryver et al. |
| 2005/0044058 | A1 | 2/2005 | Matthews et al. |
| 2005/0049852 | A1 | 3/2005 | Chao |
| 2005/0049874 | A1 | 3/2005 | Coffman et al. |
| 2005/0065995 | A1 | 3/2005 | Milstein et al. |
| 2005/0075859 | A1 | 4/2005 | Ramsey |
| 2005/0075878 | A1 | 4/2005 | Balchandran et al. |
| 2005/0078805 | A1 | 4/2005 | Mills et al. |
| 2005/0080625 | A1 | 4/2005 | Bennett et al. |
| 2005/0080782 | A1 | 4/2005 | Ratnaparkhi et al. |
| 2005/0086059 | A1 | 4/2005 | Bennett |
| 2005/0114854 | A1 | 5/2005 | Padisetty et al. |
| 2005/0131672 | A1 | 6/2005 | Dalal et al. |
| 2005/0132380 | A1 | 6/2005 | Chow |
| 2005/0137939 | A1 | 6/2005 | Calabria et al. |
| 2005/0144064 | A1 | 6/2005 | Calabria et al. |
| 2005/0144065 | A1 | 6/2005 | Calabria et al. |
| 2005/0187818 | A1 | 8/2005 | Zito et al. |
| 2005/0192992 | A1 | 9/2005 | Reed et al. |
| 2005/0193055 | A1 | 9/2005 | Angel et al. |
| 2005/0216356 | A1 | 9/2005 | Pearce et al. |
| 2005/0246726 | A1 | 11/2005 | Labrou et al. |
| 2005/0257148 | A1 | 11/2005 | Goodman et al. |
| 2005/0283473 | A1 | 12/2005 | Rousso et al. |
| 2006/0005207 | A1 | 1/2006 | Louch et al. |
| 2006/0059434 | A1 | 3/2006 | Boss et al. |
| 2006/0064302 | A1 | 3/2006 | Ativanichayaphong et al. |
| 2006/0107219 | A1 | 5/2006 | Ahya et al. |
| 2006/0156248 | A1 | 7/2006 | Chaudhri et al. |
| 2006/0179404 | A1 | 8/2006 | Yolleck et al. |
| 2006/0206835 | A1 | 9/2006 | Chaudhri et al. |
| 2007/0027850 | A1 | 2/2007 | Chan et al. |
| 2007/0038614 | A1 | 2/2007 | Guha |
| 2007/0038934 | A1 | 2/2007 | Fellman |
| 2007/0067217 | A1 | 3/2007 | Schachter et al. |
| 2007/0100688 | A1 | 5/2007 | Book |
| 2007/0101279 | A1 | 5/2007 | Chaudhri et al. |
| 2007/0101297 | A1 | 5/2007 | Forstall et al. |
| 2007/0106495 | A1 | 5/2007 | Ramsey et al. |
| 2007/0106496 | A1 | 5/2007 | Ramsey et al. |
| 2007/0130124 | A1 | 6/2007 | Ramsey et al. |
| 2007/0130134 | A1 | 6/2007 | Ramsey et al. |
| 2007/0130186 | A1 | 6/2007 | Ramsey et al. |
| 2007/0192179 | A1 | 8/2007 | Van Luchene |
| 2007/0209013 | A1 | 9/2007 | Ramsey et al. |

FOREIGN PATENT DOCUMENTS

| | | |
|---|---|---|
| EP | 1 580 666 A2 | 9/2005 |
| WO | 0129823 A1 | 4/2001 |
| WO | 03001413 A1 | 1/2003 |
| WO | WO 2004/017230 A1 | 2/2004 |
| WO | WO 2005/036365 A2 | 4/2005 |

OTHER PUBLICATIONS

U.S. Appl. No. 11/246,847, filed Oct. 7, 2005, Ramsey, et al.
U.S. Appl. No. 11/270,407, filed Nov. 9, 2005, Ramsey, et al.
U.S. Appl. No. 11/294,581, filed Dec. 5, 2005, Yao, et al.
U.S. Appl. No. 11/294,262, filed Dec. 5, 2005, Ramsey, et al.
U.S. Appl. No. 11/294,265, filed Dec. 5, 2005, Ramsey, et al.
"DTS: Programming: Creating the Custom Task Framework", 1 page, accessible at: http://msdn.microsoft.com/library/default.asp?url=/library/en-us/dtsprog/dtspeusttskc_3hwr.asp, last accessed Jan. 5, 2006.
Ernst, et al., "A Task Framework for the Web Interface W2H", Bioinformatics, 2003, pp. 278-282, vol. 19, No. 2, Oxford University Press.
Multi-Agent Systems Lab, "TAEMS: A Framework for Task Analysis, Environment Modeling, and Simulation", 3 pages, accessible at: http://dis.cs.umass.edu/research/taems/, last accessed Jan. 5, 2006.
Hochberg, et al., "A Flexible Framework for Developing Mixed-Initiative Dialog Systems", Association for Computational Linguistics, Proceedings of the Third SIGdial Workshop on Discourse and Dialogue, Jul. 2002, pp. 60-63, Philadelphia.
AgileTek, "Componentized Architecture", 2 pages, accessible at: http://www.agiletek.com/agileplus#CompArchitecture, last accessed Jan. 5, 2006.
H. Lieberman, et al., "Instructible Agents: Software That Just Keeps Getting Better", IBM Systems Journal, 1996, pp. 539-556, vol. 35, Nos. 3 and 4.
"Technical Forum: Machine Intelligence and the Turing Test", IBM Systems Journal, 2002, pp. 524-539, vol. 41, No. 3.
O. Conlan, et al., "Applying Adaptive Hypermedia Techniques to Semantic Web Service Composition", In Proceedings of AH 2003: Workshop on Adaptive Hypermedia and Adaptive Web-based Systems, 2003, pp. 53-62.

H. Liu, et al., "Goose: A Goal-Oriented Search Engine with Commonsense", Adaptive Hypermedia and Adaptive Web-Based Systems, Second International Conference, AH 2002, Malaga, Spain, May 29-31, 2002, Lecture Notes in Computer Science, pp. 253-263, No. 2347.

Leon Peshkin, "Research Statement", 2 pages, accessible at: http://people.csail.mit.edu/pesha/my_res.pdf, last accessed Jan. 5, 2006.

Korns Associates "Our Intelligent Agents", 4 pages, accessible at: http://www.korns.com/technology.htm, last accessed Jan. 5, 2006.

V. Chepegin, et al., "CHIME: Service-Oriented Framework for Adaptive Web-Based Systems", in Paul De Bra (ed): Proceedings of Dutch national conference InfWet, Eindhoven, the Netherlands, Nov. 20, 2003, pp. 29-36.

Esposito, Dino. "Browser Helper Objects:The Browser the Way You Want It." Microsoft Corporation, Jan. 1999, 12 pages.

Mills, "Google Flight search takes off", http://www.news.com/Google-flight-search-takes-pff/2100-1038_3-5917821. html; Oct 28, 2005.

Google Toolbar; "Revision History"; http:www.google.com/support/toolbar/bin/static.py?page=version_info.html; Dec. 11, 2000.

International Search Report dated Mar. 29, 2007, mailed Mar. 30, 2007, for International Application No. PCT/US2006/044418, 3 pages.

Clarifying Search : A User-Interface Framework for Text Searches. Http://www.dlib.org/dlib/january97/retrieval/01shneiderman.html.

Free Microsoft Office Information Bridge Framework. Http://www.microsoft.com/industry/government/InformationBridge.mspx.

Usability for component Based Portals. http://www.128.ibm.com/developerworks/web/library/us-portal.

OA Dated Jun. 30, 2008 for U.S. Appl. No. 11270407, 33 pages.

OA Dated Jun. 26, 2008 for U.S. Appl. No. 11367292, 35 pages.

OA Dated Jun. 16, 2008 for U.S. Appl. No. 11270393, 21 pages.

OA Dated May 13, 2008 for U.S. Appl. No. 11294265, 27 pages.

AdWords Reference Guide, *Google,* 114 pages (Nov. 30, 2004).

U.S. Non-Final Office Action cited in U.S. Appl. No. 11/246,847 mailed Oct. 18, 2006.

U.S. Final Office Action cited in U.S. Appl. No. 11/246,847 mailed Apr. 11, 2007.

U.S. Non-Final Office Action cited in U.S. Appl. No. 11/270,393 mailed Dec. 19, 2006.

U.S. Final Office Action cited in U.S. Appl. No. 11/270,393 mailed Jun. 4, 2007.

U.S. Non-Final Office Action cited in U.S. Appl. No. 11/270,393 mailed Nov. 20, 2007.

U.S. Non-Final Office Action cited in U.S. Appl. No. 11/270,393 mailed Mar. 2, 2009.

U.S. Final Office Action cited in U.S. Appl. No. 11/270,407 mailed Jan. 2, 2009.

U.S. Non-Final Office Action cited in U.S. Appl. No. 11/294,262 mailed Nov. 28, 2007.

U.S. Final Office Action cited in U.S. Appl. No. 11/294,262 mailed May 13, 2008.

U.S. Non-Final Office Action cited in U.S. Appl. No. 11/294,262 mailed Sep. 22, 2008.

U.S. Final Office Action cited in U.S. Appl. No. 11/294,262 mailed Mar. 12, 2009.

U.S. Non-Final Office Action cited in U.S. Appl. No. 11/294,262 mailed Aug. 21, 2009.

U.S. Non-Final Office Action cited in U.S. Appl. No. 11/294,265 mailed Nov. 28, 2007.

U.S. Non-Final Office Action cited in U.S. Appl. No. 11/294,265 mailed Nov. 26, 2008.

U.S. Non-Final Office Action cited in U.S. Appl. No. 11/294,265 mailed Jun. 12, 2009.

U.S. Non-Final Office Action cited in U.S. Appl. No. 11/294,581 mailed Nov. 28, 2007.

U.S. Non-Final Office Action cited in U.S. Appl. No. 11/294,581 mailed May 13, 2008.

U.S. Final Office Action cited in U.S. Appl. No. 11/294,581 mailed Feb. 5, 2009.

U.S. Non-Final Office Action cited in U.S. Appl. No. 11/294,581 mailed Jun. 23, 2009.

U.S. Non-Final-Office-Action cited in U.S. Appl. No. 11/367,292 mailed Dec. 10, 2008.

U.S. Final Office Action cited in U.S. Appl. No. 11/367,292 mailed Jun. 12, 2009.

U.S. Final Office Action cited in U.S. Appl. No. 11/294,265 on Dec. 16, 2009.

U.S. Final Office Action cited in U.S. Appl. No. 11/294,581 mailed Dec. 30, 2009.

International Search Report mailed Apr. 11, 2007 in Application No. PCT/US2006/043663.

U.S. Non-Final Office Action cited in U.S. Appl. No. 11/294,265 mailed Feb. 23, 1020.

U.S. Non-Final Office Action cited in U.S. Appl. No. 11/367,292 mailed Feb. 23, 2010.

U.S. Final Office Action cited in U.S. Appl. No. 11/294,262 mailed Apr. 1, 2010.

* cited by examiner

ADAPTIVE SEMANTIC REASONING ENGINE

BACKGROUND

Human languages are rich and complicated and include hundreds of vocabularies with complex grammar and contextual meaning. The same question, thought, meaning, etc. can be expressed in a multiple number of ways. Thus, machine interpretation of human language is an extremely complex task and often the result or action produced does not accurately map or correspond to the user intent.

Machine or software applications or languages generally require data to be input following a specific format or rule. Humans desiring to interact with the machine may become frustrated or unable to communicate effectively due to the rigid rules and the unfamiliarity or lack of knowledge of such rules. Providing users the ability to communicate effectively to an automated system without the need to learn a machine specific language or grammar increases system usability. However, users can become quickly frustrated when automated systems and machine are unable to correctly interpret the user's input, which can produce an unexpected result, an undesired result, and/or no result at all.

Natural language input can be useful for a wide variety of applications, including virtually every software application with which humans interact. Typically, during natural language processing the natural language input is separated into tokens and mapped to one or more actions provided by the software application. Each software application can have a unique set of actions, which are somewhat limited in nature. As a result, it can be both time-consuming and repetitive for software developers to draft code to interpret natural language input and map the input to the appropriate action for each application.

Therefore, to overcome the aforementioned deficiencies, there is a need for an adaptive shared infrastructure that can be easily utilized to enable natural interaction between user(s) and machine system(s). There is also a need for interactive techniques that produce accurate intent-to-action mapping. In addition, there is a need for a natural language interface that learns and/or adapts based upon one or more user input(s), action(s), and/or state(s).

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with an adaptive semantic reasoning engine. Disclosed is a technique for utilizing feedback at many levels to produce more accurate intent-to-action mapping. The adaptive semantic reasoning engine may be a subcomponent of an objective platform and may provide an extensible adaptive data driven framework for existing and new applications seeking to incorporate natural user interfaces and understanding.

According to some embodiments is an architecture that supports a combination of feedback friendly technologies that can be utilized to construct an accurate and adaptive engine. These technologies can include statistical learning models (e.g., Hidden Markov Model (HMM) for semantic slot-filling, Naïve-Bayesian model for Information Retrieval (IR), Max Entropy Min Divergence (MEMD) for ranking and/or query and context to asset mapping). Traditional IR technologies can be utilized to construct an accurate and adaptive reasoning engine.

Some embodiments employ ranking algorithms that enable slot matching and filling. These algorithms may further combine feature scoring components in an adaptive manner. Ranking and componentized slot filling architecture and technology experimentation can also be supported. Alternatively or in addition, architecture to integrate and support distributed word breaking, tiered named entity recognizers, and task framework may be provided to enable mapping a user intent and feedback to an action. Some embodiments can employ a feedback and training flow architecture to support training the various components and/or models that the reasoning engine may utilize to map the intent to the action.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents. Other advantages and novel features will become apparent from the following detailed description when considered in conjunction with the drawings.

DETAILED DESCRIPTION

Figure 1:
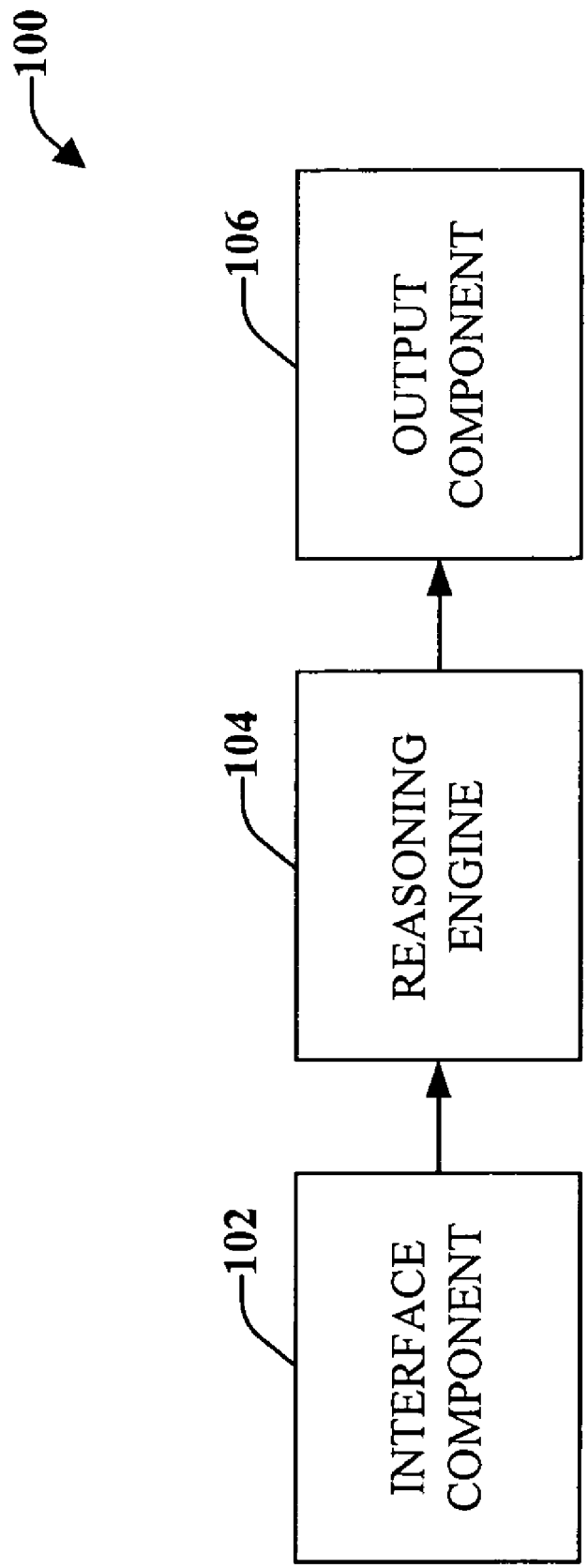
FIG. 1 illustrates an automated system for mapping a user intent to an action.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component, "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As used herein, the terms to "infer" or "inference" refer generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

Referring initially to FIG. 1, illustrated is an automated system 100 for mapping user intent to an action. System 100 includes an interface component 102 that receives an input from a user and/or entity (e.g., the Internet, another system, a computer, . . . ), an adaptive reasoning engine 104 that maps the input to an action. Reasoning engine 104 can include a feedback and training flow and architecture that supports training of various components/modules that reasoning engine 104 utilizes to map user intent to action performed. System 100 further includes an output component 106 that communicates the action to the user and/or entity (referred to as "user"). It is to be understood that the systems disclosed herein may include additional components and/or may not include all of the components discussed and illustrated. In addition, a combination of the disclosed approaches may also be used.

Input component 102 is configured to receive or accept a user input (e.g., statement, query, context, . . . ) in a plurality of forms such as typing, writing, selecting, talking, or other interactive techniques. User interaction involves understanding user intentions and then taking the appropriate actions. Input component 102 can provide various types of user interfaces. A graphical user interface (GUI) allows users to express their intents by directly manipulating the graphical objects. A voice user interface (VUI) allows users to express their intents by directly manipulating the speech acts. GUI and VUI are techniques for structuring and presenting the "application semantic space" in a form that best helps the user to map, manipulate, interact with, and achieve their intentions.

For example, a GUI can be rendered that provides a user with a region or means to load, import, input, etc. a query, statement, request, etc. and can include a region to present the results of such query, etc. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation of results or actions may be provided that include vertical and/or horizontal scroll bars for navigation and toolbar buttons to determine whether a region will be viewable can be employed. The user may interact with the interface component 102 by entering the query or information into an edit control.

The user can also interact with the interface component 102 to select and provide information through various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the embodiments are not so limited. For example, merely highlighting a check box can initiate information conveyance. In another example, a command line interface can be employed. For example, the command line interface can prompt (e.g., through a text message on a display and/or an audio tone) the user for information by providing a text message. The user can than provide suitable information, such as alpha-numeric input corresponding to an option provided in the interface prompt or an answer to a question posed in the prompt. It is to be appreciated that the command line interface can be employed in connection with a GUI and/or application program interface (API). In addition, the command line interface can be employed in connection with hardware (e.g., video cards) and/or displays (e.g., black and white, and EGA) with limited graphic support, and/or low bandwidth communication channels.

System 100 can be guided by the principle that recognizing a user intention is an adaptive pattern recognition problem where the patterns to be recognized are the domain entities and tasks because the representation eventually should point to what needs to be done in the application. System 100 can also be guided by the principle that advanced pattern recognition applications are seldom carried out in a single step but in a manner that involves multiple processing stages.

Reasoning engine 104 is configured to receive the input and leverage a plurality of types and sources of information to achieve reasoning, presentation and/or action. Various technologies can be employed by reasoning engine 104 including information retrieval (IR), slot filing and learning (feedback on an asset and slot level), or a combination thereof, to map the user intent to an action. Reasoning engine 104 provides an adaptive shared infrastructure that is easy to use and enables natural interaction between a user and a machine (e.g., computer, computing device, electronic device, and the like). For example, a user can input into interface component 102 an intent, query, statement, etc. such as "I want to find a flight from Boston to Seattle." Reasoning engine 104 maps the statement into some action (e.g., set of tasks) with the result being "departure is Boston" and "arrival is Seattle." Thus, system 100 allows a transformation from a natural language query to an underlying semantic representation through reasoning and may present results or take action(s) intelligently, though the output component 106.

Further, reasoning engine 104 is configured to be adaptive by utilizing feedback through measuring and/or learning techniques. For example, referring to the above example another user may initiate the same query by inputting "I want a flight going towards Boston" while another user may input "I want a flight heading to Boston." System 100 can accept each of these inputs and learn how different users are phrasing the same intent or desired action. Reasoning engine 104 can apply the feedback to a variety of statistical models.

Figure 2:
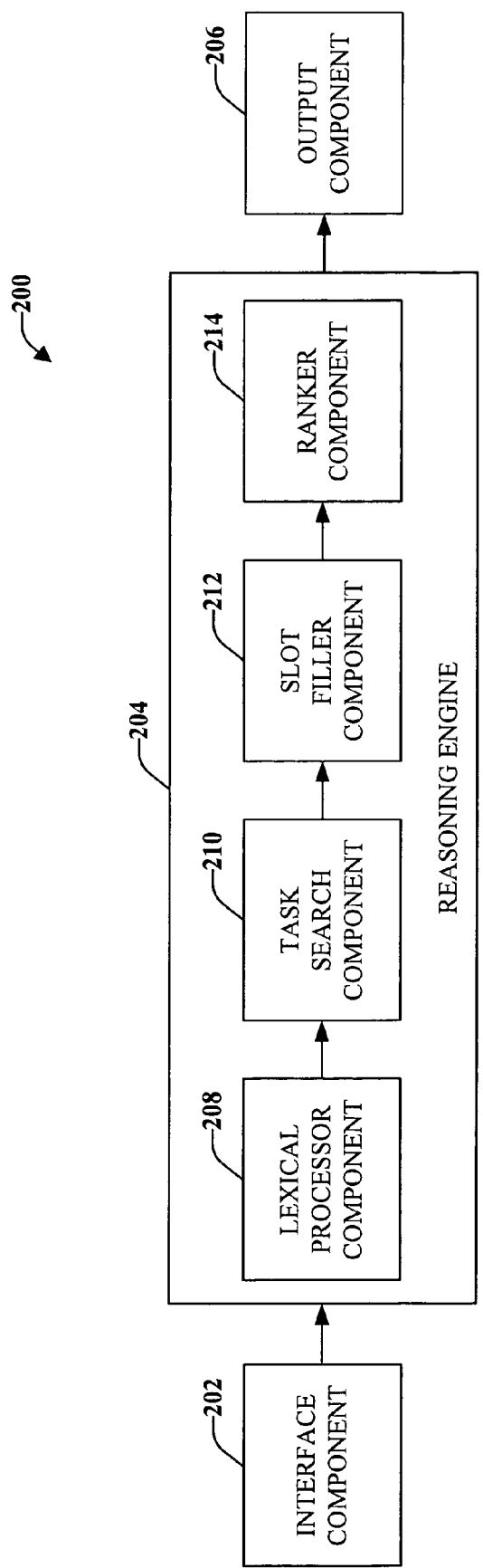
FIG. 2 illustrates an automated system for mapping an input to a recommended or automatically implemented action.

FIG. 2 illustrates an automated system 200 for mapping an input to a recommended or automatically implemented action. System 200 include an input component 202 though which a user inputs or request an intent or desired action, a reasoning engine 204 that maps the intent to the desired action, and an output component 206 that performs the action or displays the action and/or the result of the action.

Reasoning engine 204 can be configured to analyze the input, search for and determine appropriate task mapping, and rank the mapping results. To perform such actions, reasoning engine 204 can include or interface with a lexical processor component 208, a task search component 210, a slot filler component 212, and a ranker component 214.

Lexical processor component 208 can be configured to receive the user input (e.g., statement, query, request, and the like) through the interface component 202, which may be in natural language format, and break or divide that input into a token or set(s) of tokens. Tokens are a string of characters. In addition or alternatively, the user input may include a context(s). Context can be a representation of recent user actions (e.g., clicking on items, inserting input somewhere, . . . ), software applications active on the user's computer (e.g., having a table open, having certain applications running, . . . ) or other information indicative of the user's state. Anything that describes the application state or what action(s) the user has performed can be a context. For example, for a given input users may tend to click on a certain document and the terms included in the input can change over time, depending on what a user clicks or selects. This user context information can be fed back to the reasoning engine 204 continuously or periodically.

In order to divide the input into a token or set(s) of tokens, lexical processing component 208 can take the statement, "I want to find a flight from Boston to Seattle" and break the statement into tokens, wherein each token represents one word (e.g., "I," "want," "to," "find," . . . ) or a phrase ("I want to find," "a flight," . . . ). Lexical processor component 208 may be configured to recognize key words, terms, phrases, and the like, which can be referred to as named entity recognition. Lexical processing may be achieved by leveraging a word breaking and/or named entity recognition architecture. For example, lexical processor component 208 can be configured to recognize city names, states, dates, times, or other terms depending on the query input and the particular mapping to be performed. Other techniques can also be utilized by system 200. For example, system 200 can integrate and support a distributed word breaking technique, a tiered named entity recognizer technique, and/or task framework techniques to map user intent, perform actions, and/or provide feedback.

Task search component 210 can be configured to find or return the best tasks or documents utilizing the token and/or context and determine an appropriate database to utilize. There are numerous tasks that can be retrieved by task search component 210 and such tasks should be edited or reduced into a manageable number of tasks. To perform its various functions, task search component 210 can employ various techniques including query classification, information retrieval, and/or context classifier to find and determine which is the best database. For example, this may be achieved by retrieving the top N assets given a query and a set of context, where N is an integer equal to or greater than zero. An example would be to retrieve a number of results by creating a table that may include contents, figures, or other information, such as:

Result #1: Create a table
Result #2: Create a table of contents
Result #3: Create a table of figures . . .

Once one or more databases are selected, slot filler component or engine 212 can fill slots associated with the database(s). Slots provide information about how to conduct a task or other action and are a holder for piece(s) of data and/or information that may be retrieved from a natural language input. Slot filler component 212 may fill in parameters for the potential task(s). Slot filling may be performed on structured Assets utilizing a plurality of algorithmic methods and/or techniques. Unified ranking may be utilized to combine asset retrieval and slot filling.

For example, an airline reservation system can include a "Book Flight" task that includes slots for the arrival city, departure city, arrival date/time, departure data/time, number of passengers, etc. The information to be inserted into each slot can be retrieved from the natural language input (e.g., "I want a flight from New York to San Diego with 2 passengers leaving on Feb. 5, 2006, and returning on Feb. 21, 2006."). In another example, a word processing application can include a "Create Table" task having slots for the number of rows, number of columns, line style, etc. The slots can receive values from a natural language input (e.g., "Insert a 4 by 7 table with dashed lines."). Determining possible mappings from natural language input to the appropriate task slots can be solved utilizing a variety of different mathematical or statistical learning techniques such as Hidden Markov Models (HMM), for example.

Ranker component 214 can be configured to analyze the slot filling arrangement or slot filling goodness. This analysis can be accomplished by various algorithms (e.g., final ranking algorithm), methods, and/or techniques. The results may be (re)ranked differently depending on various factors, including the slot filling goodness. A unified (global) ranking combining Asset retrieval and slot-filling, information retrieval (IR), query classifier, slot-fill. ranker, etc. can be utilized.

Slot filling goodness will be described with reference the following example. A query is entered into system 200 and forms, for example, are found (IR portion). A determination is made as to which form to present in ranked form (query classifier portion). Two scores are generated, one for the IR portion and one for the query classifier portion. Next, the structure is reviewed and ranking is performed on the structure, producing another score. Each part produces a score that it thinks is relevant to the initial query. At the end of the process, system 200 combines the scores and determines a final score based on each part's input. This final ranking or score can be feedback to improve performance of future queries for this user as well as other users. Final ranking can combine ranking scores from traditional IR, query classifier and slot-filling. Several options can be utilized including, learning weights of individual scores using a MEMD model, interleaving, and/or simple summation/product.

System 200 can further utilize user interaction flow instrumentation for feedback enablement and learning. Mechanisms (e.g., interfaces, flows, . . . ) can be provided for acquiring user explicit and/or implicit feedback. Explicit feedback can be provided through, for example, a user interface, such as user rating, forms and/or dialogs. Implicit feedback can be provided through click-through or user selections. Examples of implicit feedback include whether a user clicks on (e.g., selects) a previous or next task list marker or whether a user clicks on the most likely task/semantic solution. Further examples can include the response to a prompt (e.g., "Were all task slots relevant filled out?"), whether the user filled in missing slots, whether a user selected "ok" to execute a task or cancelled the task, etc.

System 200 through machine learning, artificial intelligence, and the like can learn from this feedback (explicit and/or implicit) to improve system 200 performance and capabilities. From the gathered feedback, the accuracy, precision and recall of system 200 can also be determined. Thus, system 200 includes mechanism(s) (interfaces) for acquiring user feedback and learning from the feedback.

Figure 3:
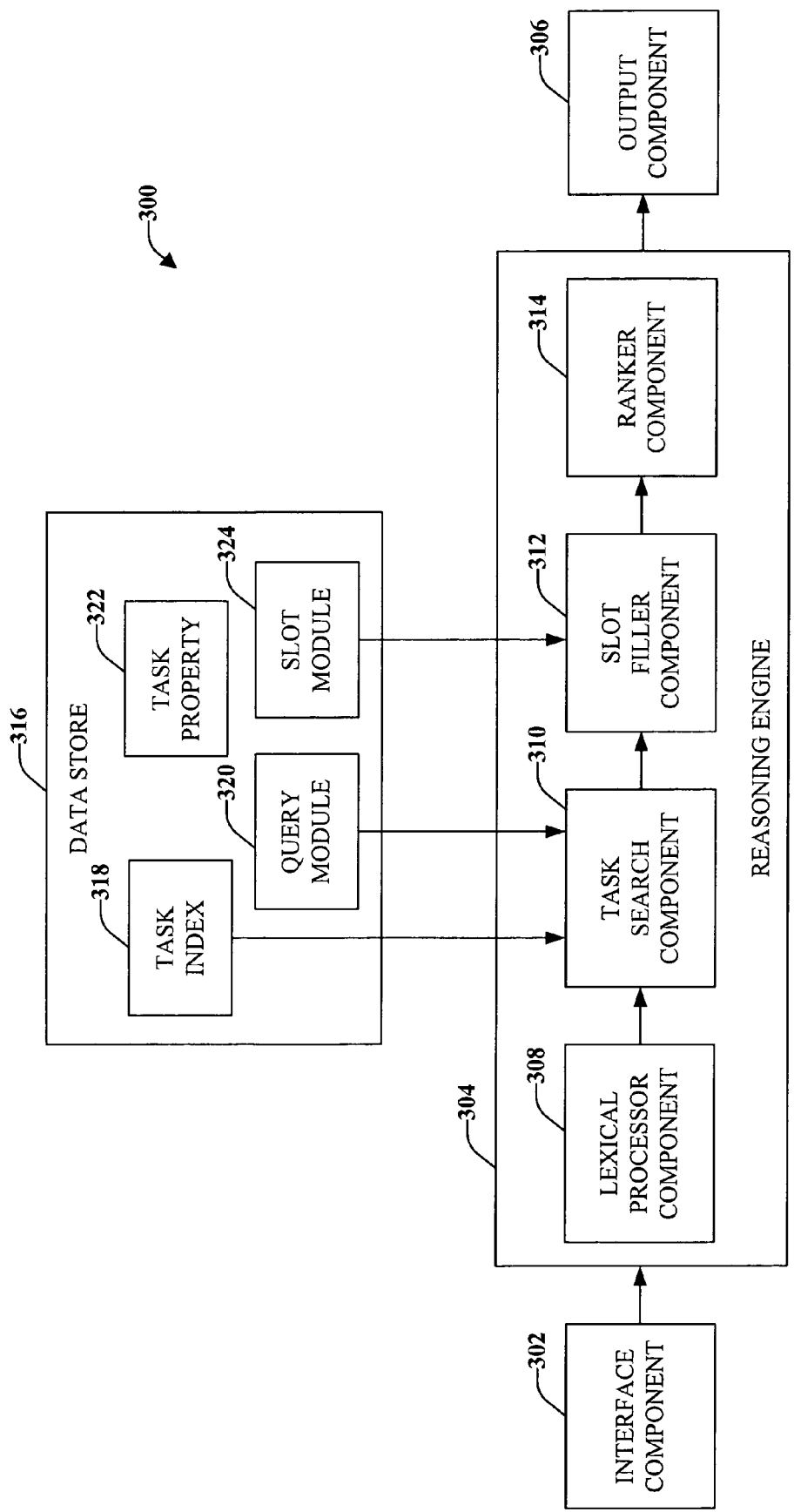
FIG. 3 illustrates a system for determining an action based upon a natural language inquiry or request.

With reference now to FIG. 3, illustrated is a system 300 for determining an action based upon a natural language inquiry or request. System 300 includes an interface component 302 that accepts or receives the natural language inquiry and a reasoning engine 304 that processes the query and maps the input to an action, which is output or implemented through an output component 306. It should be understood that while interface component 302 and output component 306 are illustrated as separate from reasoning engine 304, in accordance with various embodiments, either or both components 302 and 306 could be component(s) of reasoning engine 304.

Reasoning engine 304 can include a lexical processor component 308 that determines a token or set(s) of tokens from the natural language inquiry. A task search component 310 can be configured to find, search, retrieve, etc. the best tasks or documents utilizing the token and/or context and determine an appropriate database to utilize. The task search component 310 can receive, request, search, obtain, etc. information from a, database, or other storage means 316 that can include a task index 318 and/or a query module 320. A task property 322 is also searched or referenced that can include information about the specific task(s), database(s), etc. Task search component 310 is configured to retrieve tasks relevant to a query or request without first considering or matching slots. It can also narrow down the candidate list for slot matching. Various technologies can be utilized for task search and discovery such as an IR system, query classifier, context classifier, and/or a combination of these techniques. There are various ranking systems that can be utilized by these techniques. For example, an IR system can utilize an Okapi based ranking system, a query classifier (query to asset mapping) can utilize a Naïve-bayesian model, and a combined query and context can utilize a maximum entropy minimum divergence (linear discriminative) model.

Reasoning engine 304 can further include a slot or task filler component or engine 312 that can fill slots associated with the database(s). Slot filler component 312 can receive, request, search, obtain, etc. information from a slot module 324 associated with data store 316. Slot filler component 312 can utilize various algorithms, methods, techniques, etc. to facilitate slot filling determinations. Slot filler component 312 can be bootstrapped by authored data, such as annotations and/or sample queries. It can then improve itself using feedback data. Slot filler component 312 can include, for example, mapper and lattice builder techniques, a decoder component, and a scorer component. For example, statistical learning modules, such as HMM can be utilized for semantic slot filling. Slot filler component 312 may take a set of tokens and construct a semantic solution that represents the best mapping of the input query to some pre-specified structure. For example, slot filler component 312 can convert the query: "I want a flight on XYZ Airline leaving tomorrow morning from Boston or Manchester and arriving in Seattle or Portland" to a semantic representation such as:

---

BookFlight[ airline= "American", DepartureTime=Tomorrow-Morning, DepartureCity=("Boston" or "Manchester"), ArrivalCity=("Seattle" or "Portland")]

---

The slots are ranked by a ranker component 314 that can rank or re-rank the slots in a different order than originally ranked by reasoning engine 304 in order to achieve an action or output that is similar to the desired intent as communicated in the natural language inquiry. Ranker component 314 can utilize various algorithms, methods, techniques (e.g., MEMD for overall ranking), etc. to performing the ranking function. Mapping of user intent can be treated as an adaptive pattern recognition problem and reasoning models (generative/discriminative) can be imposed to achieve proper maps and/or adaptation. For a particular task multiple ranking mechanisms (e.g., IR, query and context classifiers, structured slot ranking, etc.) can be utilized. Managing the combination of scores from individual features to produce a single rank may be solved by a global ranker technique.

In addition or alternatively, system 300 can utilize MEMD for query plus context to perform asset or intent-to-action mapping. Ranking algorithms, methods, and/or techniques that enable slot matching and filling can be utilized. These ranking algorithms can further combine feature scoring components in an adaptive method (e.g., global ranking). Slot filling and ranking is a multistage system that can invoke IR, click through query classifier (CTM), click through context classifier (CXM) and/or a slot filing system.

Figure 4:
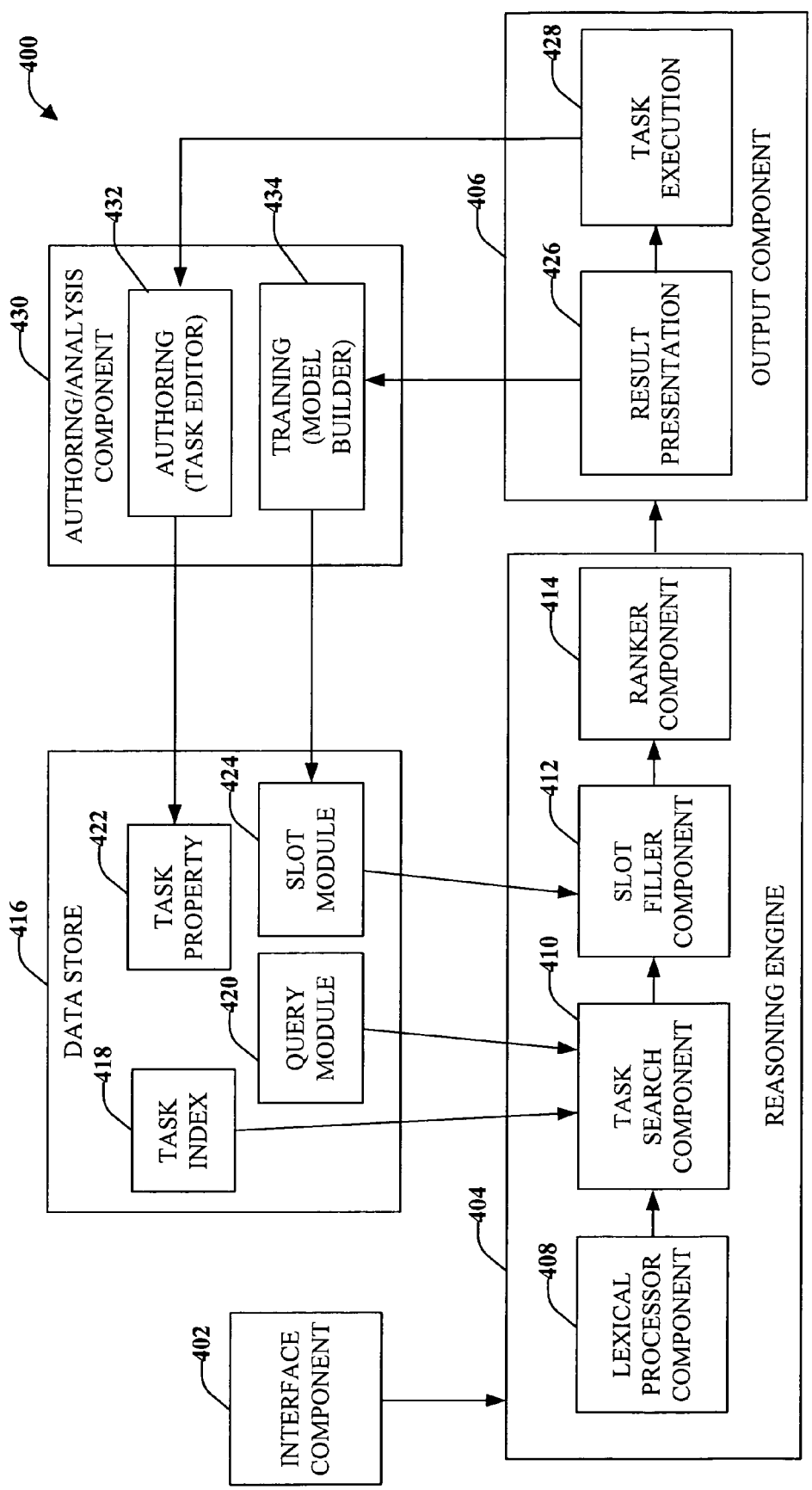
FIG. 4 illustrates a system configured to solicit or receive information through a feedback mechanism.

FIG. 4 illustrates a system 400 configured to solicit or receive information through a feedback mechanism. System is similar to the systems 100, 200 and 300 shown and described with reference to the above figures. An output component 406 of system 400 can include a result presentation module 426 and/or a task execution module 428.

Result presentation module 426 can present the results of the mapped action to a user and, in some embodiments, may be included as part of the reasoning engine 404. Task execution module 428 can execute the task automatically or through user interaction. For example, task execution module 428 can automatically execute the task and present the results of the task to the user through the result presentation module 426. In accordance with other embodiments, output component 406 can present the results to the user through the result presentation module 426 and prompt the user, through the interface component 402, for example, whether the user would like the task performed. If the user would like the task performed, the task execution module 428 can implement the action. If the user does not want the task performed, the user can cancel the task and input another inquiry or perform other actions.

Result presentation module 426 can communicate or feed information back to the reasoning engine 404 through an authorizing/analysis component 430. Associated with the authoring/analysis component 430 is an authoring (task editor) 432 and a training (model builder) 434.

Figure 5:
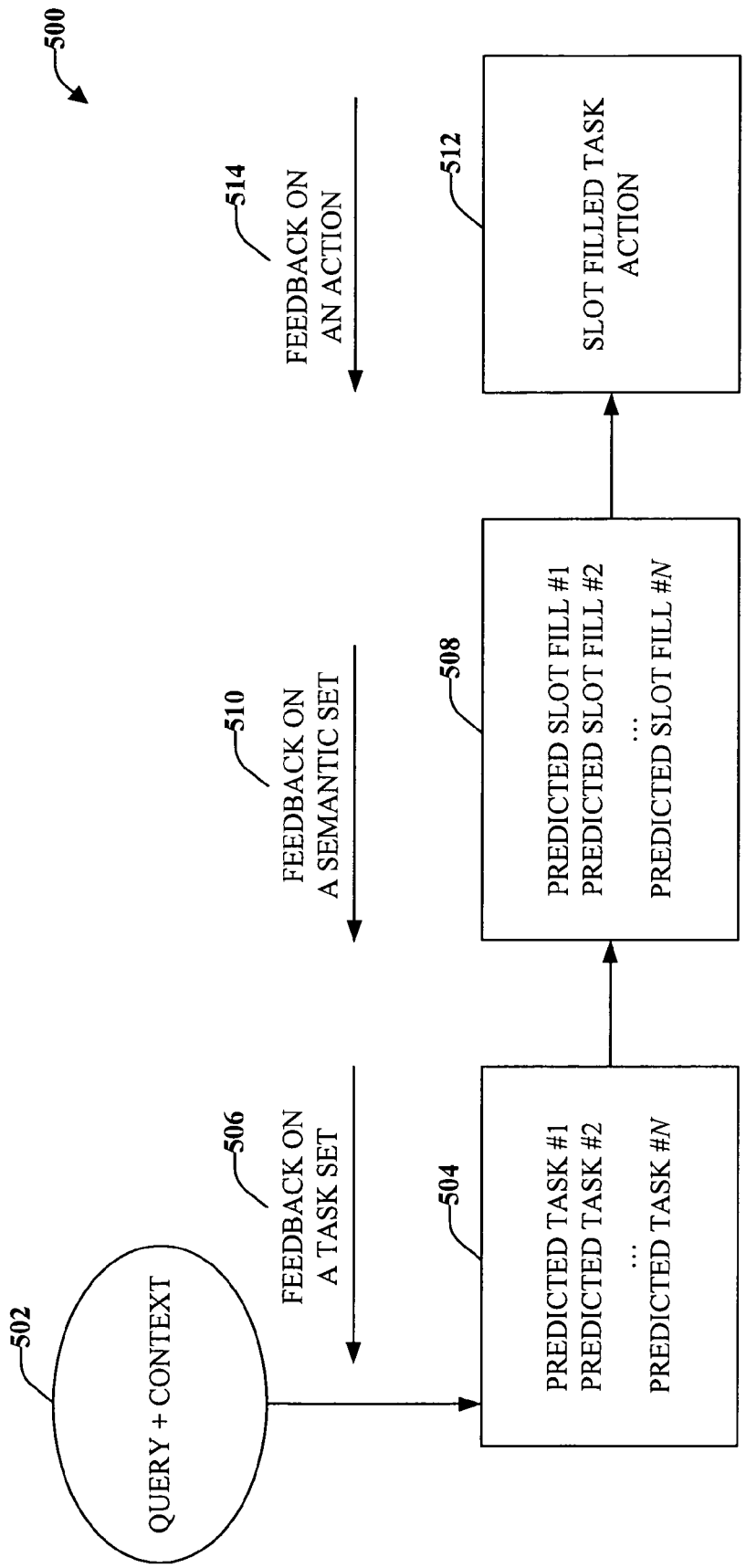
FIG. 5 illustrates a flow diagram of feedback techniques utilized with the disclosed embodiments.

FIG. 5 illustrates a flow diagram 500 of feedback techniques utilized with the disclosed embodiments. The flow diagram 500 depicts two levels of arriving at the final instance (execution) and the feedback that is generated per level. Task definitions utilize this flow diagram 500, while a search task utilizes the flow diagram that will be discussed with reference to FIG. 6.

A signal 502 that may include a query and a context are received. Based on the received signal 502 a ranked order of predicted slot filled tasks 504 is determined. There can be from one to N predicted tasks (e.g., Predicted Task #1; Predicted Task #2, . . . Predicted Task #N), where N is an integer greater than or equal to one. At this level (502) each predicted task is the highest semantic solution (e g., best slot fill solution). The order of prediction (ranking) and its relevance per prediction is compared to the other candidate predictions.

Feedback on a task set 506 is included in an input that contains a signal 502. This feedback may be provided by the click through of a predicted task (e.g., selected task) which is the best slot fill solution (as determined by the user and/or autonomously by system). The user may click through based on a relevant title, summary, or other criteria. Rating, comparison and/or feedback can be provided on a user's level of satisfaction of the input signal 502 to a task map prediction order.

Once a task is selected, the order of slot filled semantic solutions per task 508 is ranked. This ranking can include from one to N number of predicted slot fill solutions (e.g., Predicted Slot Fill Solution #1, Predicted Slot Fill Solution #2, . . . Predicted Slot Fill Solution #N), where N is an integer greater than or equal to one. Each predicted semantic solution could be ranked ordered. The order of prediction (ranking) of each slot fill solution and its accuracy compared to other candidate predictions is evaluated.

Feedback on a semantic set 510 is sent and included in an input that contains a signal 502. The user may click through after determining the relevance of a restatement of the semantic solution. Rating and/or comparison feedback is provided on the level of satisfaction of the input to semantic solution prediction based on visualization and/or execution.

At this point, a semantic solution is executed and a dialog, planning and/or action is performed as a slot filled task action 512. There can be partial to complete slot fills (if partial dialog to complete slot fills). If the task is partially slot filled, it still should have discourse. If the task is completely slot filled, it is ready for execution. The slot filling accuracy and/or accuracy of the chosen semantic solution is evaluated and compared to the other slot fillings.

The feedback on the action 514 is sent and included in an input that contains a signal 502. The feedback is provided though slot re-filling or execution feedback. For example, the user may click through based on a relevance of a slot fill restatement. The rating and/or comparison is based on a level of satisfaction with the outcome from execution of the semantic solution verses the other semantic solutions.

Figure 6:
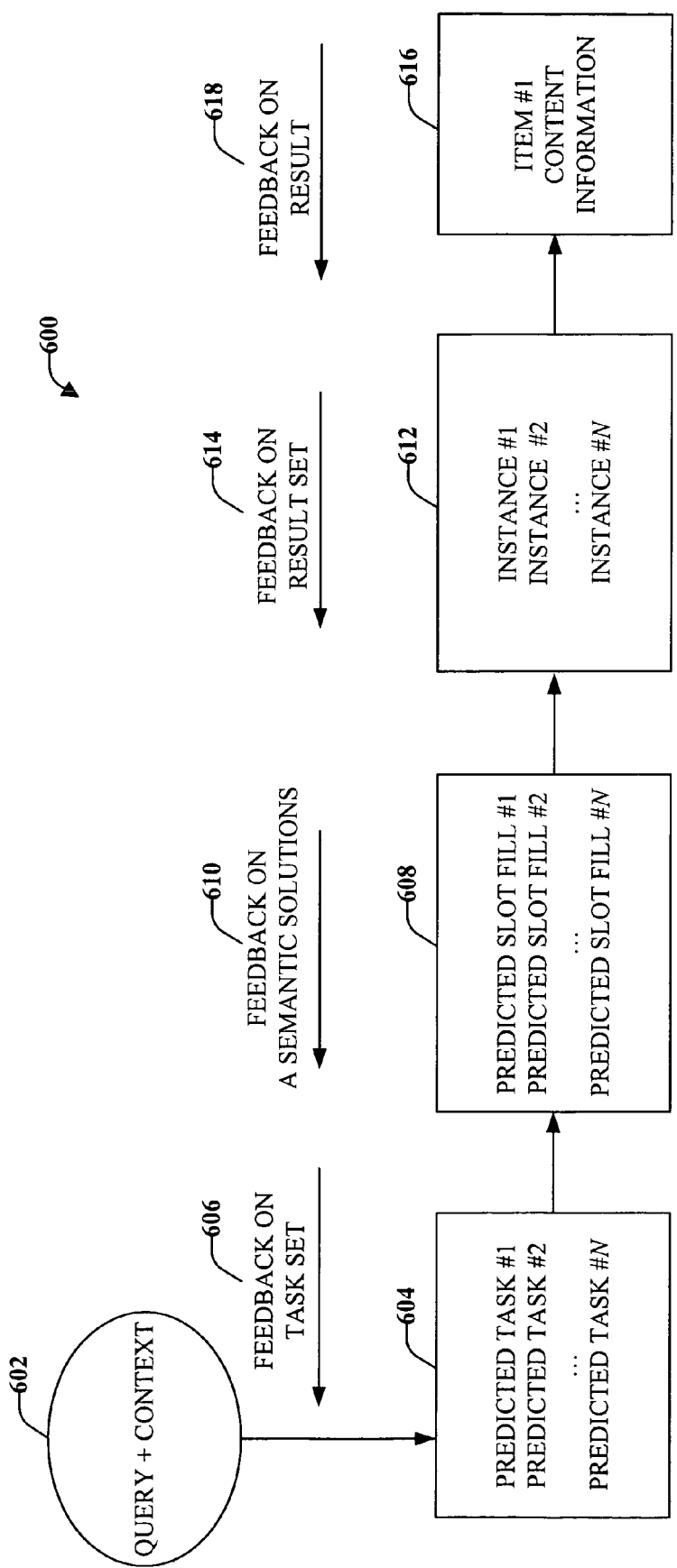
FIG. 6 illustrates a search task user interaction model and feedback that can be utilized with the disclosed embodiments.

FIG. 6 illustrates a search task user interaction model and feedback 600 that can be utilized with the disclosed embodiments. The "Search Task" includes an additional level of indirection as a consequence of execution, which is the result item(s). A signal 602 that may include a natural language query, statement, request, etc. and/or a context can be received or input into an adaptive reasoning engine. An ordered action list 604 is created that includes a ranked order of predicted slot filled tasks. There can be from one to N number (e.g., Predicted Task #1, Predicted Task #2, . . . Predicted Task #N), where N is an integer greater than or equal to one. Each predicted task may be the highest semantic solution (e.g., best slot fill solution).

The order of prediction (ranking) and its relevance per prediction is compared to the other candidate predictions. The feedback on task set 606 is provided by a click through predicted task, which is the best slot fill solution that the user clicks through. This click through can be based on the relevance of the title, summary, or other criteria. The level of satisfaction to the task map prediction order is compared and for which feedback is provided.

This selected task is selected and a re-statement "search task" 608 is performed and the selected task is incorporated into a ranked order of slot filled semantic solutions per task. There can be from one to N number of predicted slot fill solutions (e.g., Predicted Slot Fill Solution #1, Predicted Slot Fill Solution #2, . . . Predicted Slot Fill Solution #N), where N is an integer greater than or equal to one. The order of prediction or ranking may be evaluated based on each slot fill solution and its accuracy compared to other candidate predictions.

Feedback 610 is provided by clicking through the ordered slot fill solution. The feedback or click through can be provided by comparing a level of satisfaction of the input to semantic solution prediction based on visualization and/or execution. This results in an executed semantic solution.

A search result list (set) 612 is provided that includes a ranked order of a result list that includes from one to N number of instances (e.g., Instance #1, Instance #2, . . . Instance #N), where N is an integer equal to or greater than one. The task is slot filled and ready for search execution. Evaluation includes the slot filling accuracy and accuracy of the chosen semantic solution compared to the other semantic solutions.

Feedback on the result set 614 is provided through slot re-filling or complete result set feedback (e.g., execution feedback). The user may click through the instance based on, for example, a relevant title, summary, etc. of the results. The level of satisfaction with the entire result set as an outcome from executing this semantic solution is compared with the other result set(s). The result set feedback may include both pre-execution and post-execution of the task. The logic of construction post-execution is applied to the entire result set (output of a semantic solution execution). When the user clicks through, it results in selecting a search result 616.

The search result 616 can include an item (e.g., Item#1) that contains content information that includes the contents of the result. The content and relevance with respect to the input 602 is evaluated. Explicit and/or implicit satisfaction with the result is sent 618 along with a comparison of a level of satisfaction with the result versus other results.

The result satisfaction can be utilized to rate the result set satisfaction that facilitates comparison of other semantic solution result sets. This is the added level of indirection. For example, image for a particular query the system tries to compare the quality of the search result with a search result performed by another system, program, etc. This comparison can be performed during a post execution state. The result sets can be reviewed and rated by the user glancing at the title, summaries, etc. of the results. The user can review more in depth information and judge the relevance of the result set, if desired. It should be noted that the feedback propagates backwards to help compare and contrast each stage's output.

Figure 7:
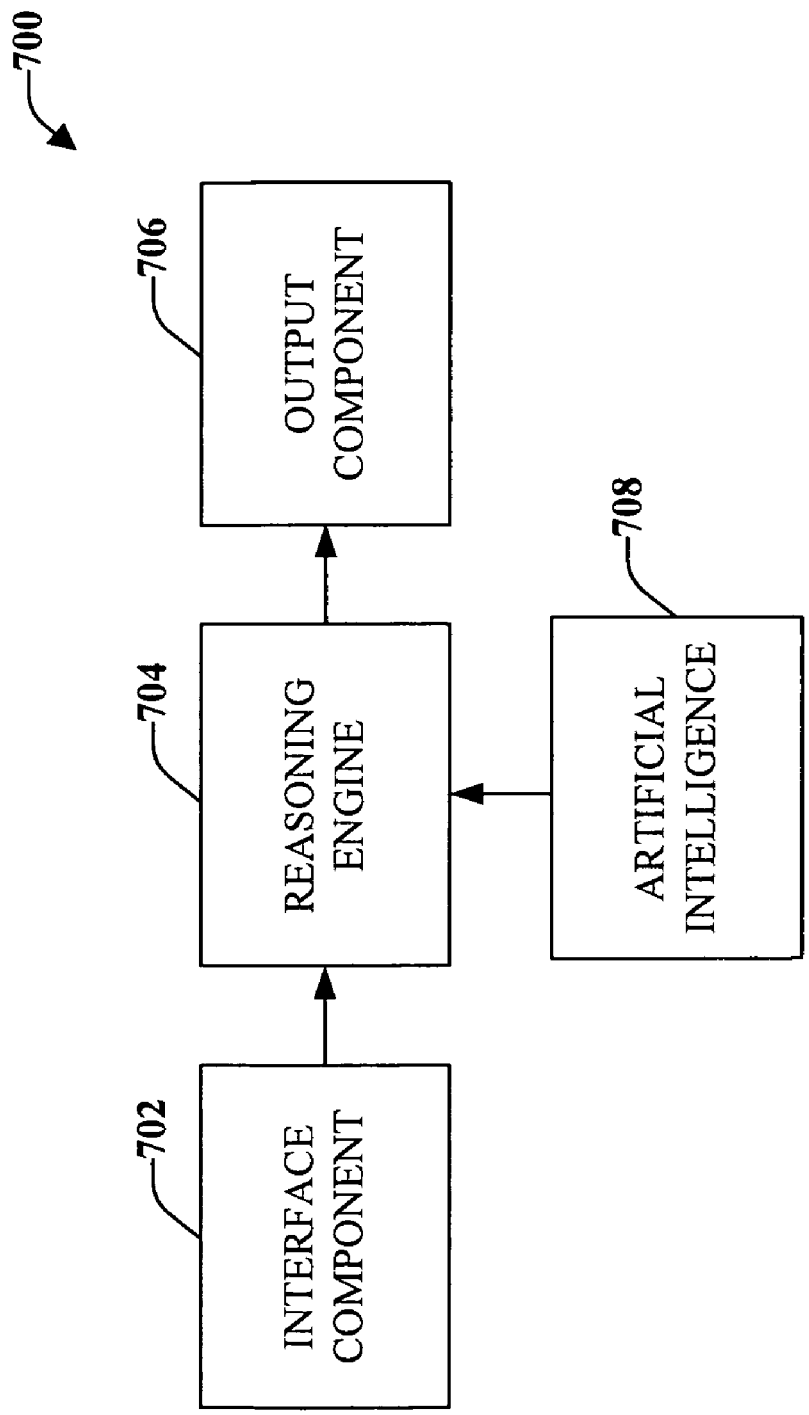
FIG. 7 illustrates a system that employs artificial intelligence (AI) which facilitates automating one or more features in accordance with the embodiments disclosed herein.

FIG. 7 illustrates system 700 that employs artificial intelligence (AI) which facilitates automating one or more features in accordance with the embodiments disclosed herein. The AI can be effected through AI component 706 as illustrated, or alternatively or in addition, a rules-based logic component.

The various embodiments (e.g., in connection with mapping a natural language request to an executed action) can employ various AI-based schemes for carrying out various aspects thereof. For example, a process for determining if a particular user has made similar requests or if other users have made a similar request can be facilitated through an automatic classifier system and process. Moreover, where multiple databases are employed having the same or similar resources, the classifier can be employed to determine which database to employ in a particular situation.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be performed. In the case of natural language systems, for example, attributes can be words or phrases or other data-specific attributes derived from the words (e.g., database tables, the presence of key terms), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the disclosed embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to grant access, which stored procedure to execute, etc. The criteria can include, but is not limited to, the amount of data or resources to access through a call, the type of data, the importance of the data, etc.

Figure 8:
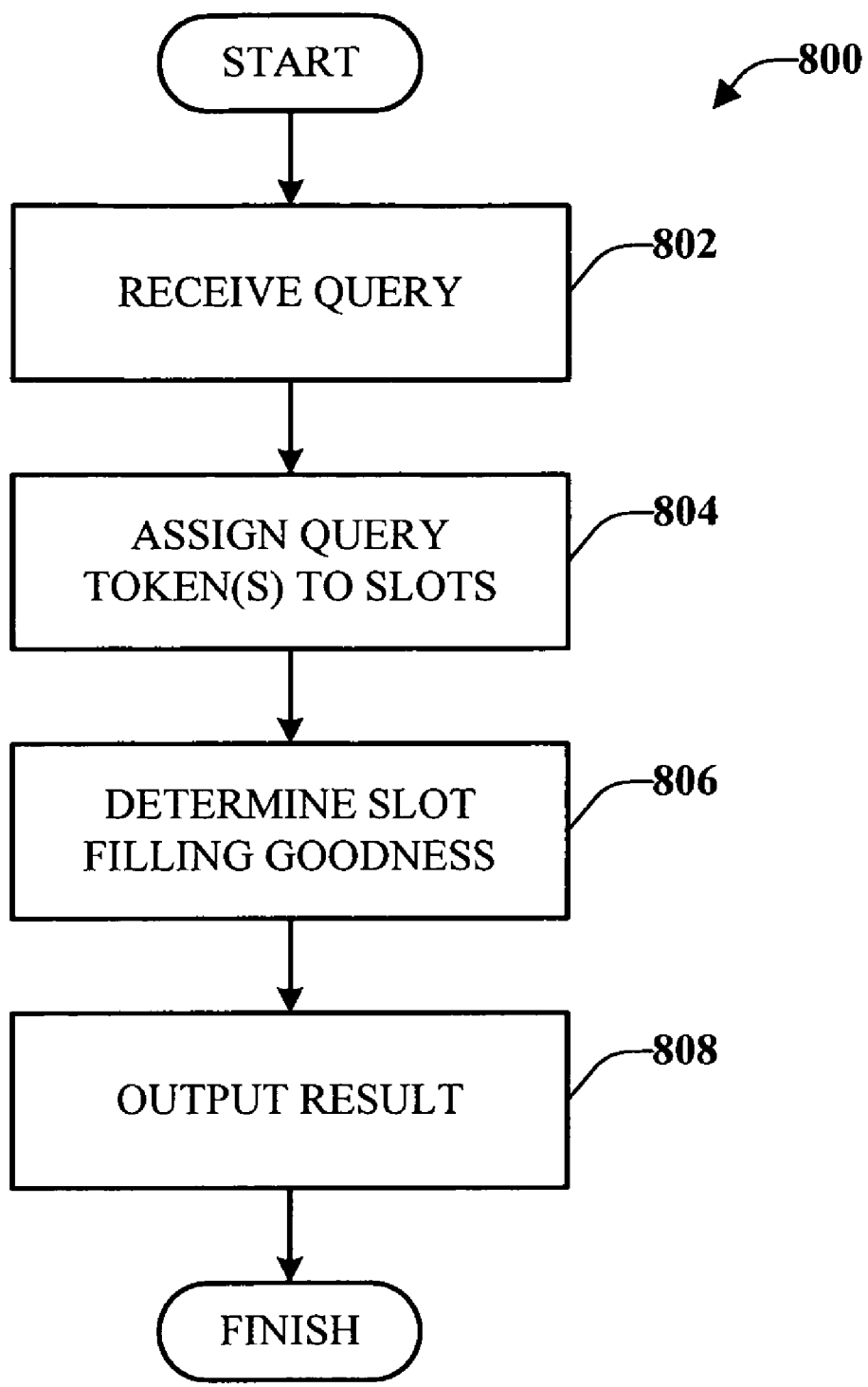
FIG. 8 illustrates a methodology for determining an action inferred from a natural language request.
Figure 9:
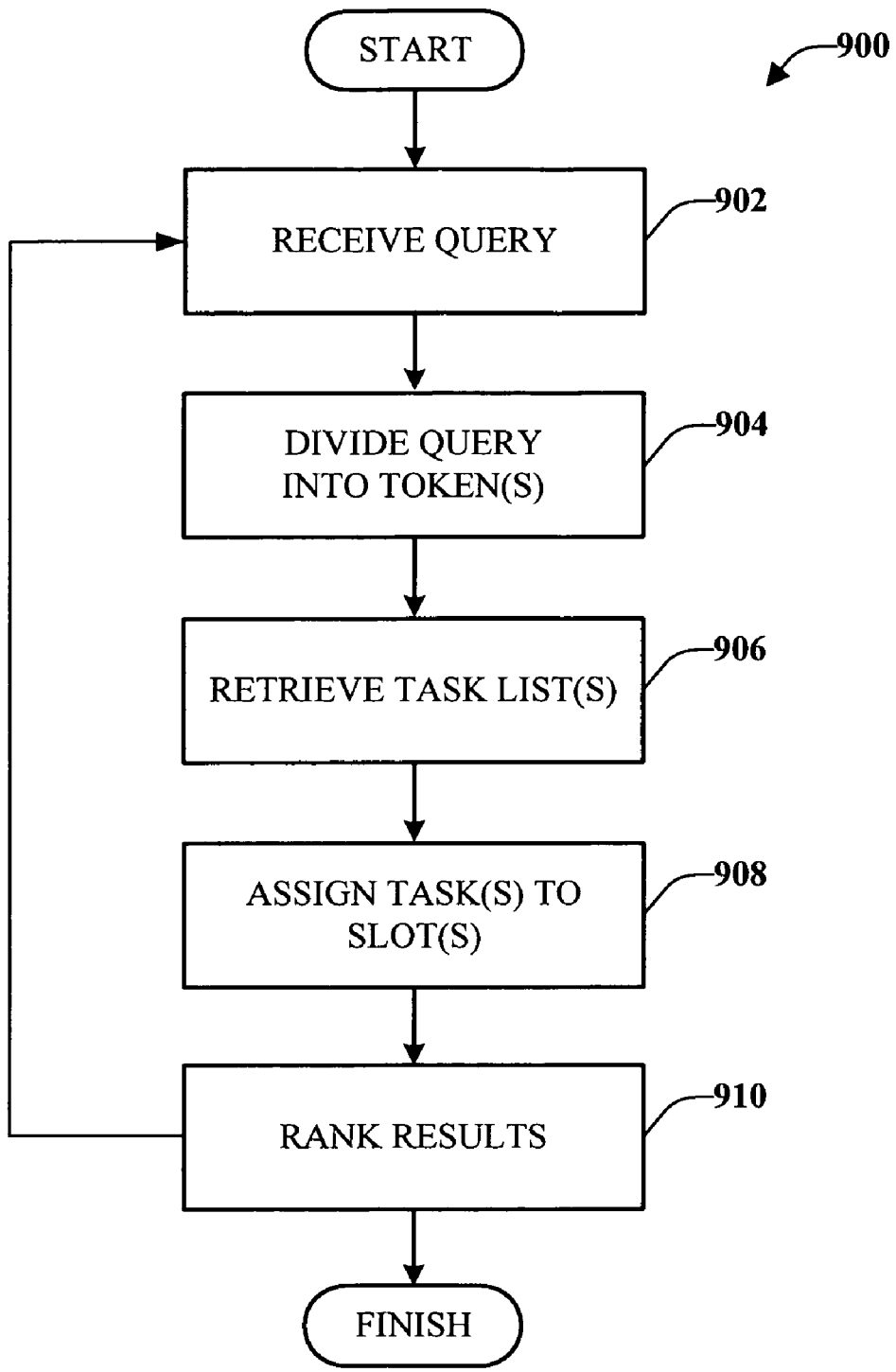
FIG. 9 illustrates a methodology for assigning natural language tokens to task slots in order to execute a desired action.
Figure 10:
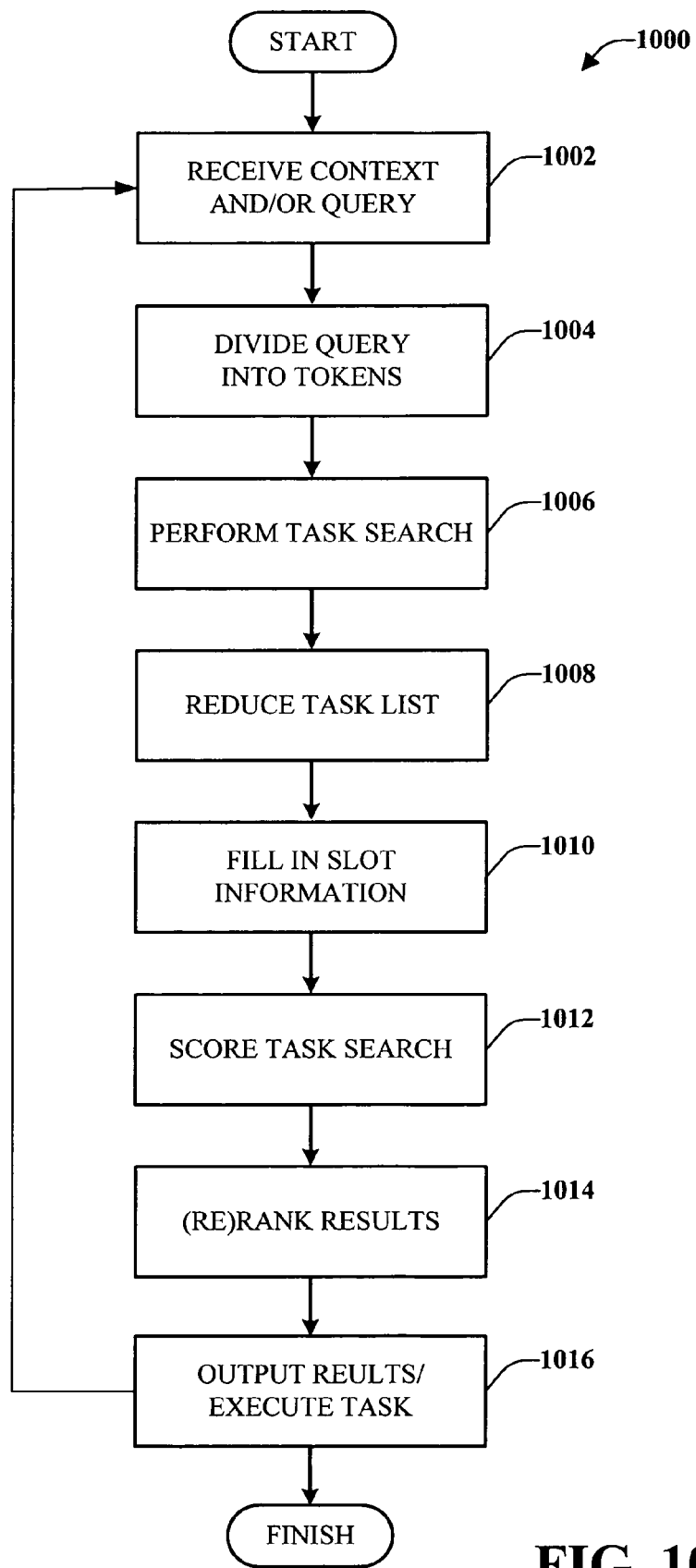
FIG. 10 illustrates a methodology for receiving a natural langue action request and determining the appropriate action and performing or recommending that action.

In view of the exemplary systems shown and described above, methodologies, which may be implemented in accordance with one or more aspects of the disclosed embodiments, will be better appreciated with reference to the diagram of FIGS. 8-10. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement a methodology in accordance with one or more aspects of the disclosed embodiments. It is to be appreciated that the various acts may be implemented by software, hardware, a combination thereof or any other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Those skilled in the art will understand and appreciate that a methodology could alternatively be represented as a series of interrelated states or events, such as in a state diagram.

Referring initially to FIG. 8, illustrated is a methodology 800 for determining an action inferred from a natural language request. At 802, a query, statement, request, etc. is received. This query can be in a plurality of forms (e.g., written, typed, spoken, . . . ) and can be in natural language form. The input can include a context or user state, user action, or other criteria including information feedback from a prior query. The naturally language query is broken into tokens or strings of characters. The tokens are assigned to task slots, at 804. Slot filling determines the best matching of a list of tokens from the natural language input with task parameters. Slot filling is further configured to facilitate experimentation with various mapping, decoding, and scoring algorism.

At 806, a slot filling goodness is determined and may be based upon an aggregate of scoring of different portions of the method 800. Slot filling goodness can take into account the ranking or ordering of the slots during the slot filling process and re-rank or change the order of the slots. At 808, the recommended action can be output to a user through a prompt, for example, whereby the user accepts the action, which is then executed. In other embodiments, the action is automatically executed without further interaction by the user.

With reference now to FIG. 9, illustrated is a methodology 900 for assigning natural language tokens to task slots in order to execute a desired action. At 902, a query (e.g., question, desired action, statement, . . . ) and/or context is received from a user and may be in natural language format. At 904, the natural language input is divided into a token or set of token(s). A task search is performed and one or more task list(s) are retrieved, at 906. The task list(s) can be retrieved from a data store, memory, or other storage component. Each task is assigned to a slot, at 908. The result of the task to slot assignment can be ranked, at 910, to determine a slot filling goodness (e.g., how well the method assigned the tasks to achieve the action desired by the user). This information can be feedback to 902 and received along with a subsequent query.

With reference now to FIG. 10 illustrated is a methodology 1000 for receiving a natural langue action request and determining the appropriate action and performing or recommending that action. At 1002, a natural language query and/or context is received. The natural language query can be a request for a particular action (e.g., "I want to fly from Dallas to Detroit."). Along with the natural language query, a context may be received. This context may include a user state, user actions, and/or other criteria relating to a user state and/or user action.

At 1004, the query is divided into tokens or strings of characters. The query may be divided into key terms, words, phrases, etc. A task search is performed, at 1006. The task search can result in a vast amount of task lists retrieved. These task lists are reduced, at 1008, into a manageable number of task lists. Slots included in the task list are filled in with the token or set of token(s), at 1010.

The task search is scored, at 1012, to determine if the search resulted in providing the requested action. The scoring can include aggregating individual scoring for each process. At 1014, the results might be re-ranked or ranked in a different order than the order determined by the slot filling process. The results or action can be output to the user or executed, at 1016. For example, the user can be sent or prompted with the recommended action. The user would accept the action or cancel the action, depending on whether the recommended action matches the user's request. This information can be feedback, at 1002, as context. The context would be whether the user accepted the action or whether the user rejected the action and/or the other actions, requests, states, etc. associated with the user. In other embodiments, at 1016, the task or action is automatically executed by the system. In this case, the context feedback to 1002 would be the user actions, states, etc. that occurred after execution of the task (e.g., what did the user do next?).

Figure 11:
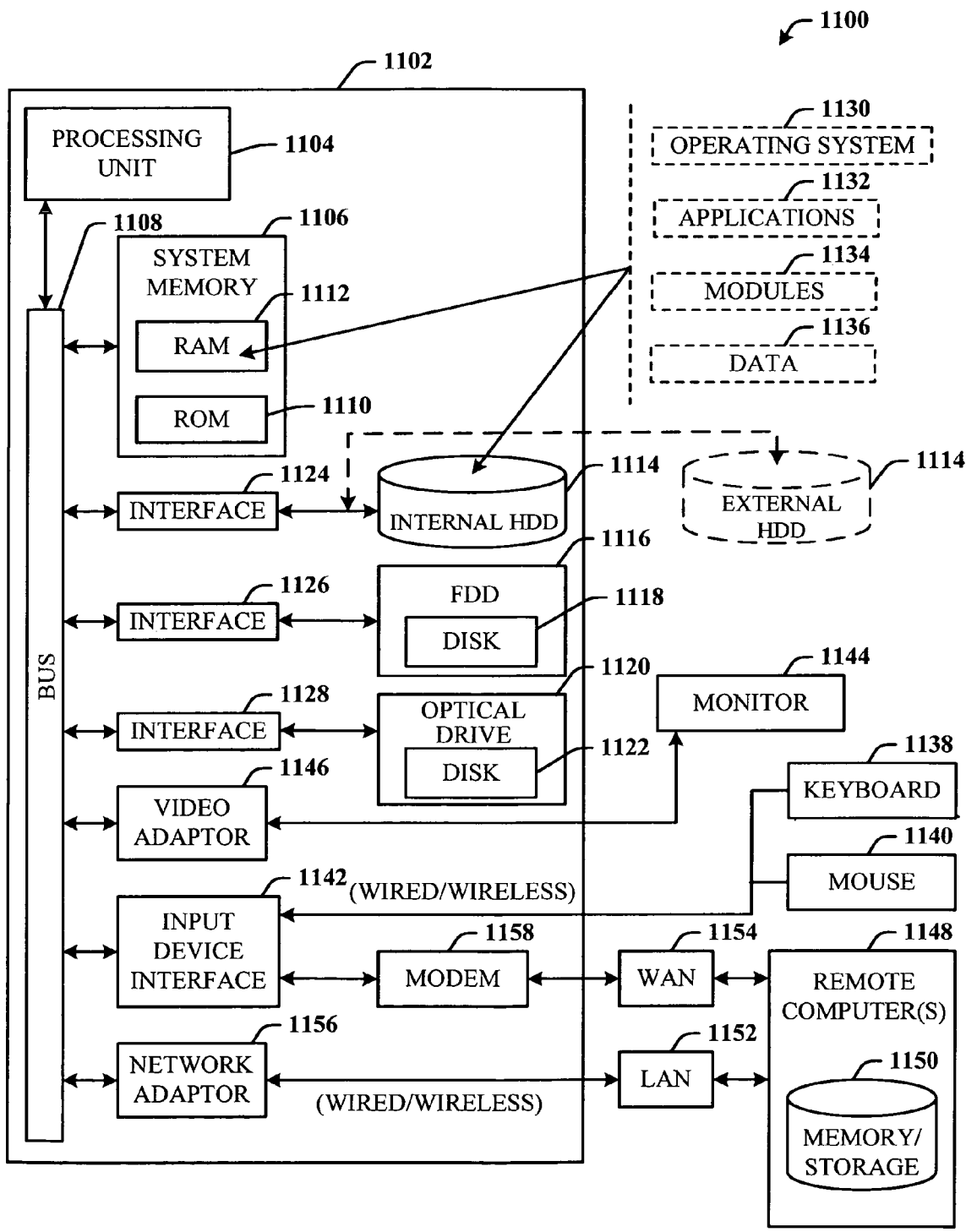
FIG. 11 illustrates a block diagram of a computer operable to execute the disclosed embodiments.

Referring now to FIG. 11, there is illustrated a block diagram of a computer operable to execute the disclosed architecture. In order to provide additional context for various aspects disclosed herein, FIG. 11 and the following discussion are intended to provide a brief, general description of a suitable computing environment 1100 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the various embodiments can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, a remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an interface, etc.

A monitor 1144 or other type of display device is also connected to the system bus 1108 through an interface, such as a video adapter 1146. In addition to the monitor 1144, a computer typically includes other peripheral output devices (not shown), such as speakers, printers, etc.

The computer 1102 may operate in a networked environment using logical connections through wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
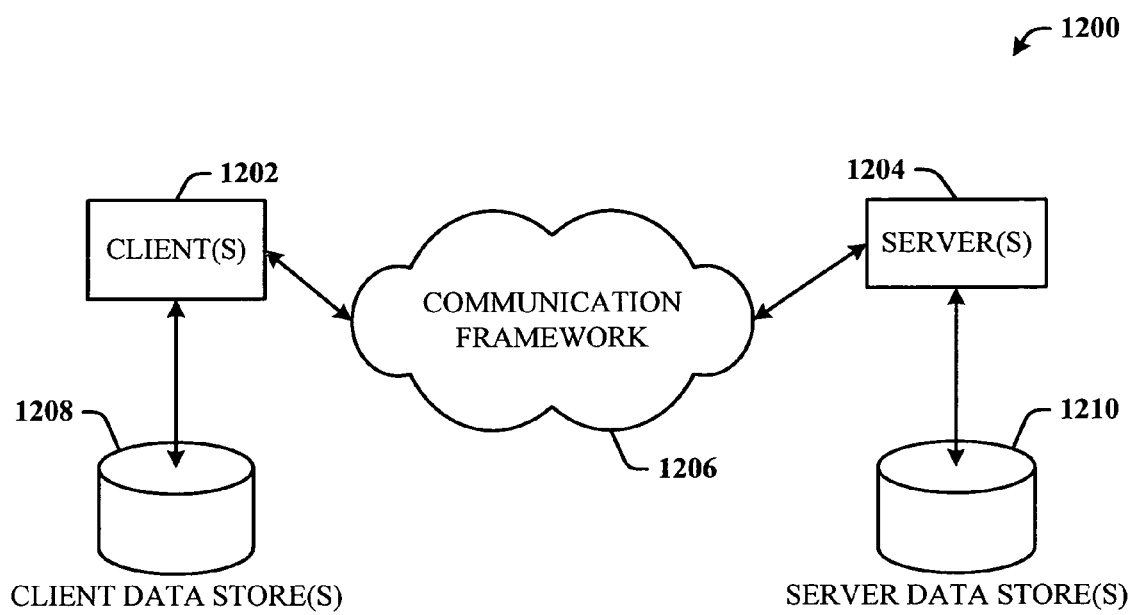
FIG. 12 illustrates a schematic block diagram of an exemplary computing environment operable to execute the disclosed embodiments.

Referring now to FIG. 12, there is illustrated a schematic block diagram of an exemplary computing environment 1200 in accordance with the various embodiments. The system 1200 includes one or more client(s) 1202. The client(s) 1202 can be hardware and/or software (e.g., threads, processes, computing devices). The client(s) 1202 can house cookie(s) and/or associated contextual information by employing the various embodiments, for example.

The system 1200 also includes one or more server(s) 1204. The server(s) 1204 can also be hardware and/or software (e.g., threads, processes, computing devices). The servers 1204 can house threads to perform transformations by employing the various embodiments, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated by a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates user intent to action mapping, the system comprising:
   a processor; and
   a memory storing computer executable instructions that, when executed by the processor, cause the system to:
      receive a natural language input and a user context, the user context being information indicative of previous actions of a user, the natural language input and the user context associated with the user intent;
      break the natural language input into a plurality of tokens;
      retrieve a plurality of tasks, each task in the plurality of tasks being relevant to the natural language input, each task in the plurality of tasks having slots to hold pieces of information about the task;
      generate semantic solutions for tasks in the plurality of tasks, a semantic solution for a task being a mapping of tokens in the plurality of tokens to the slots of the task;
      use a ranking algorithm to rank the semantic solutions for tasks in the plurality of tasks;
      output a slot-filled task, the slot-filled task being a task in the plurality of tasks whose slots contain a highest-ranked one of the semantic solutions for the task;
      receive feedback from the user regarding the slot-filled task; and
      train the ranking algorithm based on the feedback from the user.

2. The system of claim 1,
   wherein the computer executable instructions, when executed by the processor, cause the system to reduce the plurality of tasks into a reduced plurality of tasks, the reduced plurality of tasks including fewer tasks than the plurality of tasks; and
   wherein the computer executable instructions, when executed by the processor, cause the system to use the ranking algorithm to generate semantic solutions for tasks in the reduced plurality of tasks exclusively.

3. The system of claim 1, wherein the computer executable instructions cause the system to use the ranking algorithm to rank the semantic solutions in part by causing the system to utilize one of the following to rank the semantic solutions: Hidden Markov Model (HMM), Max Entropy Min Divergence (MEMD), and Information Retrieval (IR) technology.

4. The system of claim 1, wherein the computer executable instructions, when executed by the processor, cause the system to iteratively receive prior mapped actions as feedback to the mapping algorithm to adaptively train the mapping algorithm.

5. A method for reasoning an action based on a natural language input, the method comprising:
   receiving, by a computer, a query, a user context, and feedback associated with prior slot assignments, the user context being information indicative of previous actions of a user;
   transforming, by the computer, subsets of the query into tokens;
   retrieving, by the computer, a plurality of tasks utilizing the tokens and the user context, each task in the plurality of tasks being relevant to the query, each task in the plurality of tasks having slots to hold pieces of information about the task;
   scoring, by the computer, each task in the plurality of tasks to select a best task based at least on the query and the user context;
   generating, by the computer, semantic solutions for the best task, the semantic solutions for the best task mapping ones of the tokens into the slots of the best task;
   using a ranking algorithm to rank the semantic solutions for the best task based at least in part on the feedback;
   outputting, by the computer, the best task and a best semantic solution, the best semantic solution being a highest-ranking one of the semantic solutions for the best task; and
   employing, by the computer, the best semantic solution as feedback to train the ranking algorithm.

6. The method of claim 5, further comprising after receiving the query reducing, by the computer, the plurality of tasks into a reduced plurality of tasks, the reduced plurality of tasks including fewer tasks than the plurality of tasks; and
   using the ranking algorithm to score the tasks in the reduced plurality of tasks exclusively.

7. The method of claim 5,
   wherein each task in the plurality of tasks is a search task; and
   wherein the method further comprises:
      generating, by the computer, a search result list by executing the best task using the best semantic solution, the search result list comprising a plurality of search results, the search results in the search result list ordered in an original ranking, the original ranking based on relevance to the query;
      output, by the computer, the search result list to the user;
      receive, by the computer, feedback from the user indicating appropriateness of the original ranking; and
      re-ranking, by the computer, the search results in the search result list based on the appropriateness of the original ranking such that the search results in the search result list are ranked differently if the original ranking is not appropriate.

8. The method of claim 5, further comprising:
   receiving, by the computer, another context associated with a user action after the best task is output; and
   using, by the computer, the other context to train the ranking algorithm.

9. The method of claim 5, wherein using the ranking algorithm to rank the semantic solutions comprises utilizing, by the computer, one of the following to rank the semantic solutions: Hidden Markov Model, Naïve-Bayesian model, Max Entropy Min Divergence, or Information Retrieval (IR) technology.

10. A computing device that converts a natural language input into an executed action, the computing device comprising:
- a processor; and
- a memory storing computer executable instructions that, when executed by the processor, cause the computing device to:
  - transform portions of a natural language inquiry into a plurality of tokens, the natural language inquiry received from a user, each token in the plurality of tokens being a string of characters, wherein the computing device transforms the portions of the natural language inquiry into the plurality of tokens by recognizing named entities in the natural language inquiry;
  - retrieve a plurality of search tasks, each search task in the plurality of search tasks being relevant to the natural language inquiry, each search task in the plurality of tasks having slots to hold pieces of information about the search task;
  - use a Hidden Markov Model to generate semantic solutions that map tokens in the plurality of tokens to slots of search tasks in the plurality of search tasks;
  - rank the semantic solutions for each search task in the plurality of search tasks;
  - generate an ordered action list that contains slot-filled search tasks, each of the slot-filled search tasks being a search task in the plurality of search tasks whose slots contain a highest-ranked one of the semantic solutions for the search task;
  - output the ordered action list to the user;
  - receive from the user a selection of a given search task in the ordered action list;
  - train the Hidden Markov Model based on the selection of the given search task;
  - output the semantic solutions for the given search task to the user;
  - receive from the user a selection of a given semantic solution for the given search task;
  - train the Hidden Markov Model based on the selection of the given semantic solutions;
  - generate a search result list by executing the given search task using the given semantic solution, the search result list comprising a plurality of search results, the search results in the search result list ordered based on relevance to the natural language inquiry;
  - output the search result list to the user;
  - receive a selection of a given search result in the search result list; and
  - train the Hidden Markov Model based on the selection of the given search result.

11. The method of claim 5 wherein the best task is selected based at least on feedback received in connection with prior mappings of queries to tasks.

* * * * *

UNITED STATES PATENT AND TRADEMARK OFFICE
CERTIFICATE OF CORRECTION

| | | |
|---|---|---|
| PATENT NO. | : 7,822,699 B2 | Page 1 of 1 |
| APPLICATION NO. | : 11/290076 | |
| DATED | : October 26, 2010 | |
| INVENTOR(S) | : Sanjeev Katariya et al. | |

It is certified that error appears in the above-identified patent and that said Letters Patent is hereby corrected as shown below:

In column 20, line 13, in Claim 10, delete "solutions;" and insert -- solution; --, therefor.

Signed and Sealed this
Twenty-sixth Day of July, 2011

David J. Kappos
*Director of the United States Patent and Trademark Office*